United States Patent
Anderson

[15] 3,646,979
[45] Mar. 7, 1972

[54] ROTARY BLADE FOR MEAT GRINDER

[72] Inventor: Eugene A. Anderson, Lewis Place, Box 895, Douglasville, Ga. 30134

[22] Filed: July 1, 1970

[21] Appl. No.: 51,645

Related U.S. Application Data

[63] Continuation-in-part of Ser. No. 764,407, Oct. 2, 1968, Pat. No. 3,563,291.

[52] U.S. Cl. ........................................................146/189 A
[51] Int. Cl. ..................................................B02c 18/36
[58] Field of Search ..........................146/189 R, 189 A, 182

[56] References Cited

UNITED STATES PATENTS 2,967,555  1/1961  Baker...................................146/189 R

FOREIGN PATENTS OR APPLICATIONS 957,528  8/1949  France...............................146/189 A Primary Examiner—Willie G. Abercrombie
Attorney—Newton, Hopkins & Ormsby

[57] ABSTRACT

A meat grinder in which a worm conveyor on a horizontal shaft feeds the meat to be ground toward a rotary blade or chopper provided with radially extending blade arms. The blade arms move in a rotary path and cooperate with the surface of the perforated plate for cutting or chopping action. Each blade arm has a wedge-shaped blade block provided with outwardly converging surface portions with one surface portion having a straight leading cutting edge for riding on the surface of the plate. This cutting edge is disposed forwardly of and substantially parallel to the radial axis of the blade arm. The wedge-shaped blade blocks assure even wearing of the blade blocks against the plate.

11 Claims, 5 Drawing Figures

PATENTED MAR 7 1972 3,646,979

INVENTOR.
EUGENE A. ANDERSON
BY Newton, Hopkins
& Ormsby
Attorneys

ROTARY BLADE FOR MEAT GRINDER

CROSS-REFERENCES TO RELATED APPLICATIONS

This application is a continuation-in-part of my co-pending application, Ser. No. 764,407, filed Oct. 2, 1968, now U.S. Pat. No. 3,563,291.

BACKGROUND OF THE INVENTION

This invention relates to a meat grinder and is more particularly concerned with a rotary blade for meat grinders which operates in conjunction with the perforated plate of a meat grinder to comminute or grind meat and the like, fed against the plate.

In the past, meat grinders of the general type, having a horizontal shaft which rotates, simultaneously, a worm conveyor and a chopper which rides against a perforated plate, have been widely used and are the usual type of meat grinder found in retail meat markets. The chopper or rotary blade of such meat grinders, when it becomes dull, tends to smear the meat along the surface of the plate, creating a cellophane like sheet along this surface which prevents subsequent efficient cutting of the meat. Also, the tendons of the meat are wrapped around the shaft tending to block the free flow of the meat and tending to lift radially disposed blades away from the plate, thereby reducing the efficiency of the chopper.

Furthermore, the prior art chopper blades wear unevenly, due to the fact that the peripheral portion of the blade is moving over a far longer path, each revolution, than the hub or inner portion thereof. Thus, the cutting efficiency of the peripheral portions of the blades are reduced.

To overcome this drop in efficiency, the plate of the prior art grinder is tightened against the chopper, thereby urging the chopper blades more firmly against this plate, Upon such tightening, since the wear on each increment of the blade is proportional to its distance from the axis and because the radially extending blades of the chopper yield more readily toward the periphery of the chopper, the inner or hub portions of these blades are urged more firmly against the plate. This results in more friction toward the central portion and the generation of heat in that region which possibly will burn out the plate in that region. The accompanying heating of the meat, due to such friction, may also ruin the "bloom" of the meat, thereby reducing the fresh appearance of the meat and its shelf life.

Still another problem with the prior art chopper is that the meat, being ground, has a tendency to be forced to the center where it is carried around by the blade and is never ground.

BRIEF DESCRIPTION OF THE INVENTION

Briefly described, the present invention, which overcomes or minimizes the difficulties described above, includes a chopper or rotary blade having a hub with circumferentially spaced radial extending blade arms, the chopper operating in conjunction with the perforated plate of a conventional meat grinder.

Each blade arm carries a radially extending wedge shaped block. The blade block has a straight cutting leading edge which is circumferentially forward of and substantially parallel to the radial axis of the blade arm. The surface blade of the block, circumferentially rearwardly of the cutting edge, is provided with a flat narrow or hairline bevelled blade surface having a trailing blade surface edge which forms a common edge with the major face surface of the blade block, The trailing edge of the blade block converges outwardly toward the cutting edge, intersecting the radial axis of the blade arm. By such an arrangement, progressively more metal is provided on the blade block toward the axis of rotation or hub portion, which greater mass will serve to reduce the amount of flexing of the blade toward the distal end and will also help dissipate heat generated due to the clamping force toward the center of the rotary blade.

Accordingly, it is an object of the present invention to provide a rotary blade for a meat grinder, the blade being inexpensive to manufacture, durable in structure and efficient in operation.

Another object of the present invention is to provide a rotary blade for a meat grinder, the blade having an improved or increased useful blade life.

Another object of the present invention is to provide, in a meat grinder, a rotary blade in which the cutting edges wear more evenly.

Another object of the present invention is to provide a rotary blade for a meat grinder which is detailed in construction to effectively dissipate heat buildup during operation.

Another object of the present invention is to provide, in a meat grinder, a rotary blade which will distribute the meat evenly along its cutting edge for chopping action.

Another object of the invention is to provide a rotary blade for meat grinder, the blade being more resistant to breakage.

Another object of the invention is to provide a rotary blade for a meat grinder, the blade being so constructed as to facilitate the passage of meat through the grinder with less heating of the meat, less pressure on the meat and reduced wear on the blade.

Another object of the present invention is to provide a blade for the above described purposes which is less likely to break adjacent its blade arm tips.

Another object of the present invention is to provide a blade for the above described purposes which will not cause burning or cracking of the center portion of the perforated plate with which it operates.

Another object of the present invention is to provide a blade for the purposes above described which will cut the meat adjacent the center of the plate more easily.

Another object of the present invention is to provide a blade for grinding meat, the blade rendering the ground meat with a longer shelf life and better in appearance.

Other objects, features and advantages of the present invention will become apparent from the following description when taken in conjunction with the accompanying drawings wherein like characters of reference designate corresponding parts throughout the several views, and wherein:

BRIEF DESCRIPTION OF THE DRAWING FIGURES

DETAILED DESCRIPTION OF THE INVENTION

Figure 1:
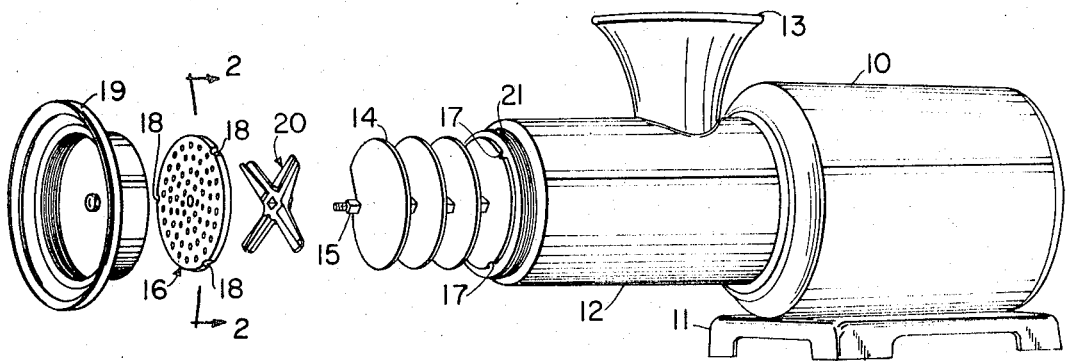
FIG. 1 is an exploded perspective view of a conventional meat grinder provided with a chopper or rotary blade constructed in accordance with the present invention.

Referring now in detail to the embodiment chosen for the purpose of illustrating the present invention and particularly to FIG. 1 of the drawing, the horizontal meat grinder depicted therein includes a motor 10 mounted on a base 11, the motor 10 carrying a sidewise projecting hollow tubular grinder housing 12. A tubular feed chute 13, having its hollow interior communicating with the interior of the housing 12, provides a means by which meat, vegetable or other fibrous material to be comminuted is fed to the grinder.

Within the grinder housing 12 is the usual worm conveyor 14 which is rotated about its axis by motor 10. The worm gear 14 feeds the meat received through chute 13 forwardly in housing 12. The outer, i.e., forward end of worm conveyor 14 is provided with an axially disposed forwardly extending shaft squared at numeral 15 for removably receiving the rotary blade or chopper, denoted generally by numeral 20.

The front of blade 20 is urged against the usual disc shaped, perforated plate 16 which is received at the end of housing 12.

Inwardly protruding fingers 17 on the inner periphery of housing 12, received in the peripheral notches 18 on plate 16, prevent rotation of the plate while a collar 19, threadedly received on the external threads 21 of housing 12, retains plate 16 in place.

Figures 2, 3:
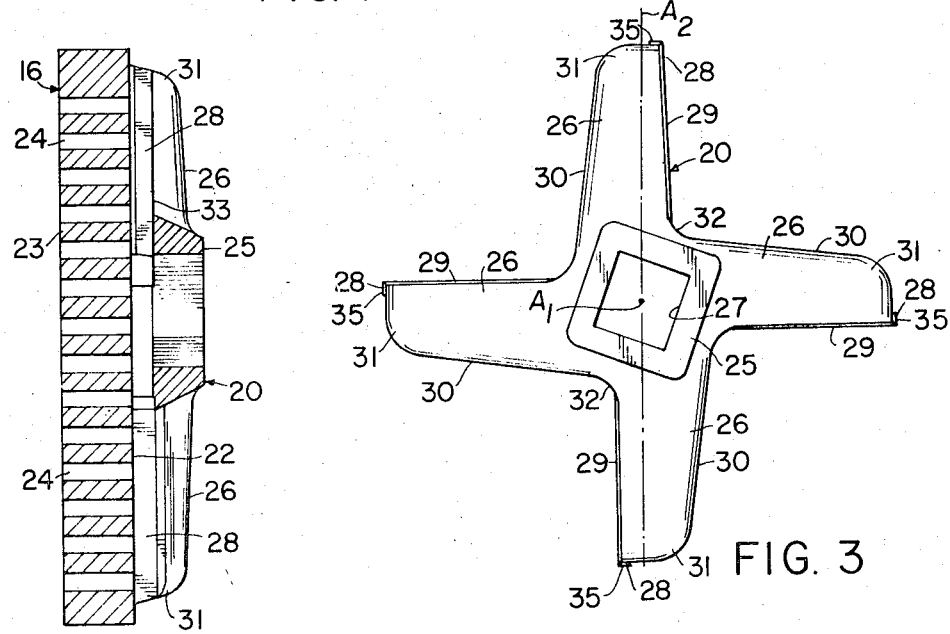
FIG. 2 is a cross-sectional view taken substantially along line 2—2 in FIG. 1.
FIG. 3 is an enlarged rear elevational view of the rotary blade of the present invention.
Figures 4, 5:
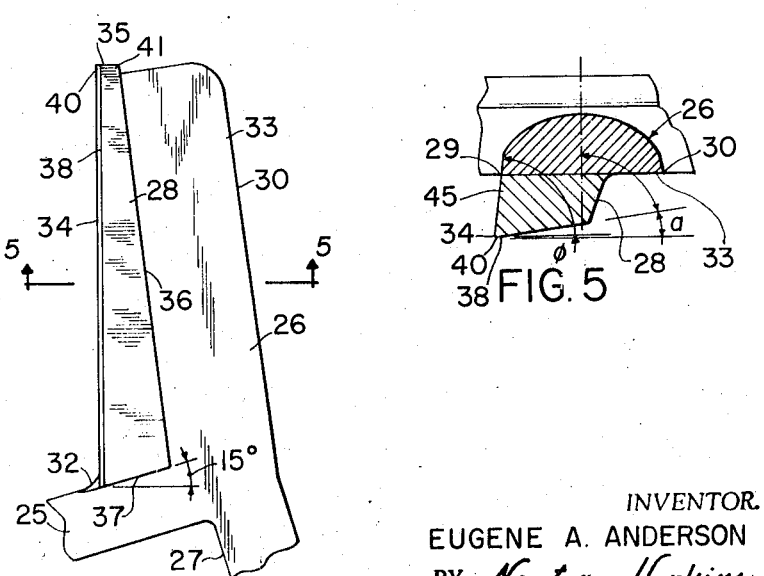
FIG. 4 is fragmentary front elevational view of one blade arm of the rotary blade of the present invention; and, FIG. 5 is a cross-sectional view taken substantially along line 5—5 in FIG. 4.

As best seen in FIG. 2, the plate 16 includes a flat polished inner surface 22, a flat outer surface 23 parallel to inner surface 22 and a plurality of circular perforations 24.

With the exception of the rotary blade or chopper 20, the structure thus far described is conventional.

The rotary blade or chopper 20 includes a hub 25 from which radiate four equally circumferentially spaced blade arms 26. The hub 25 has a square central opening 27 of appropriate dimensions to be received on the squared portion of shaft 15 and be rotated thereby about its major axis $A_1$ or rotation of axis $A_2$ in a clockwise direction, as viewed in FIG. 3.

Each of the blade arms 26 is identical and carries identical wedge shaped blade blocks 28. In more detail, each blade arm 26 extends radially outwardly from a corner of the square hub 25 and is integrally joined by its proximal end to hub 25.

The rear side of each arm 26 is convex, arcing transversely. The leading edge 29 and trailing edge 30 of each arm 26 are disposed on opposite sides of the radial axis $A_2$. The leading edge 29 is substantially parallel to the radial axis $A_2$ with the trailing edge 30 converging outwardly toward the distal end 31 of arm 26.

In the region of hub 25, each leading edge 29 merges with the trailing edge of the next adjacent blade arm 26, defining a concaved abutment edge 32.

The forward surface 33 of each arm 26 is flat, being disposed in a common radial plane with the other forward surfaces 33.

The wedge shaped blade block 28 for each arm 26 is mounted as by brazing, to the forward surface 33 and has a surface portion defining a leading cutting edge 34 in a common plane with the leading edge 29 of blade arm 26. The outer end 35 of blade block 28 extends slightly outward beyond the distal end 31 of blade arm 26, the outer end 35 being substantially narrower than the distal end 31.

The trailing edge or surface portion 36 of the blade blocks 28 converges outwardly, toward the leading edge 34 and intersects axis $A_2$ at its distal end. The blade block 28 terminates outwardly of square hub 25 in a wide transverse inner end 37, connecting the ends of edges 34 and 36.

The inner surface of the blade block 28 has a pair of abutting flat surfaces which are joined along a common edge 38, the common edge 38 lying parallel to and spaced slightly from the leading or cutting edge 34 so as to define therebetween a hairline bevelled edge or surface 40. Surface 40 is inclined slightly at about 4° from the radial plane. In addition, cutting edge 34 has a bevel angle $\Phi$ between the forward surface 45 of blade block 28 and the bevelled surface 40, of preferably approximately 77° and between 60° and 90°.

Rearwardly of the common edge 38, the major or face surface 41 of the blade block 28 is inclined at a greater angle then the angle of hairline surface 40, this relief angle between the radial plane and the surface 41 being approximately 8° and between approximately 6° and approximately 30°.

In a standard size grinder, the thickness of blade block 28 is approximately three-sixteenth inch. Also, the block 28 tapers from approximately seven-sixteenth inch in width, adjacent end 37, to approximately one-sixteenth, adjacent end 35.

The blade 20, when operating, is urged flat against the inner surface 22 of plate 16 and is rotated about its axis $A_1$ when conveyor 14 is rotated, thereby slicing the meat as the meat is urged by conveyor 14 through the holes 24.

The wider portion of the blade block 28 located adjacent the hub provides a concentration of mass near the center of rotation axis $A_2$ which helps to prevent flexing of the blade 20 at its proximal end during rotation. Corresponding, the narrower portion of the blade block 28 located toward the periphery of blade 20 helps to decrease the accumulation of meat between the blade blocks 28 and the perforated plate 16, thus preventing a lifting of the blade 20 at its distal end 31 during rotation.

As meat is being ground, sinews of the meat collect around the shaft 15 between the blade 20 and the perforated plate 16, creating a lifting force near the center of the blade 20. Thus, another purpose of the relatively large cross section of block 28 in the proximal region is to keep the lifting force acting on the blade 20 at a minimum.

A further purpose of the larger area of the blade block 28 being located toward the center of rotation $A_1$ is that the heat generated at the center due to the clamping force of the rotary blade 20 by the shaft 15 against the perforated plate 16 is readily dissipated through the large area of the block 28. The heat is more a product of the clamping force than the speed of rotation of the blade 20.

The inner end 37 of the blade block 28 is spaced radially outward from the shaft opening 27 to provide a space between end 37 and shaft 15. Also, the end 37 forms and angle of approximately 75° with the leading cutting edge 34. The inner end angled portion 37 will aid in the passage of meat tendons around shaft 15 to prevent the tendons from becoming wrapped around the shaft.

The improved efficiency of my rotary blade 20, for the reasons discussed above, reduces the power required, reduces the friction and heat and thereby enables a uniformly high-quality ground product to be produced which has an extended shelf life. Also, the useful life of plate 16 and blade 20 is extended while the shut down time for the grinder is decreased.

Thus it becomes obvious that the above-described illustrative embodiment of the rotary blade is capable of obtaining the objects and advantages of the present invention. Further, it is apparent that those skilled in the art may make modifications in the details of construction without departing from the spirit of the invention which is to be limited only by the scope of the appended claims.

I claim:

1. In an improved rotary blade for use in a grinder having a perforated plate wherein the blade is adapted to be rotated about its axis adjacent one face of the perforated plate for chopping material urged against the plate, the improved blade comprising; a blade hub portion, at least one blade arm extending radially from said hub, a blade block carried by said arm, said blade block detailed to include radially outwardly converging surface portions and wherein one of said surface portions defines a cutting edge for riding against said face of said plate for chopping material.

2. In an improved rotary blade as described in claim 1 further characterized in that said blade block has a trailing surface portion tapering outwardly with respect to said cutting edge.

3. In an improved rotary blade as described in claim 1 further characterized in that said blade block is wedge shaped and tapers outwardly.

4. In an improved rotary blade as described in claim 1 further characterized in that said blade block is provided with a face surface portion having a relief angle with respect to the radial plane of said axis of rotation of between approximately 30° and approximately 90°.

5. In an improved blade as described in claim 1 further characterized so that the inner end of said blade block is spaced outwardly of said axis of rotation and said blade block is wedge shaped having the wider portion thereof closest to said axis of rotation, with the narrower portion extending radially outward.

6. In an improved rotary blade as described in claim 1 further characterized in that said cutting edge is forward of the radial axis of its associated blade arm in the direction of rotation of the blade and substantially parallel to said radial axis.

7. In an improved rotary blade as described in claim 1 further characterized in that each of said blade blocks includes a front face and a bevelled surface intersecting to form said cutting edge.

8. In an improved rotary blade as described in claim 7 further characterized in that said front surface is inclined rearwardly and wherein said bevelled surface is disposed at an acute angle to the radial plane of said rotary blade.

9. In an improved rotary blade as described in claim 7 further characterized in that the angle subtended between said front surface and bevelled surface is between approximately 60° and approximately 90°.

10. In an improved rotary blade as described in claim 9 further characterized in that said blade block is provided with a face surface intersecting said bevelled surface, said face surface being rearwardly of said bevelled surface and disposed at a greater angle to said radial plane than said bevelled surface.

11. In an improved rotary blade as described in claim 10 further characterized in that said acute angle between the radial plane and said face surface is between approximately 6° and approximately 30°.

* * * * *